United States Patent [19] [11] 3,866,146
Van Mourik [45] Feb. 11, 1975

[54] PULSE WIDTH MODULATORS

[75] Inventor: Cornelis Van Mourik, Hoogland, Netherlands

[73] Assignee: Control Data Corporation, Minneapolis, Minn.

[22] Filed: Mar. 8, 1974

[21] Appl. No.: 449,404

[30] Foreign Application Priority Data
Oct. 22, 1973 Netherlands ........................ 7314475

[52] U.S. Cl. .................. 332/9 R, 307/265, 328/112, 332/9 T, 332/14
[51] Int. Cl. ............................................ H03k 7/08
[58] Field of Search ....... 332/9 R, 9 T, 14; 328/111, 328/112; 307/265; 325/38 R, 142

[56] References Cited
UNITED STATES PATENTS 3,277,395 10/1966 Grindle et al. .................. 328/112 X
3,492,602 1/1970 Berwin et al. .................... 307/265 X

*Primary Examiner*—Siegfried H. Grimm
*Attorney, Agent, or Firm*—Robert M. Angus

[57] ABSTRACT

A pulse width modulator according to the present disclosure includes a circuit branch having an integrating device for transforming a signal value to a pulse width of predetermined time period. The integrating device includes a first differential amplifier having an inverting and a non-inverting input, and an output, with a storage device connected between the inverting input and the output of the first amplifier. A second differential amplifier has its inverting input connected to the output of the first amplifier, and has its output connected to a reset device to reset the storage device. One signal input is supplied to the inverting input of the first amplifier and another signal input is supplied to the non-inverting input of the second amplifier. The output is taken from the output of the second amplifier. According to a modification of the apparatus, a second branch is provided, similar to the first, and arranged such that second branch forms part of the reset device for the first branch, and vice versa.

10 Claims, 4 Drawing Figures

PULSE WIDTH MODULATORS

This invention relates to pulse width modulators.

Pulse width modulators are ordinarily provided with an integration device for transforming the value of an electric signal to a pulse whose timer period represents the value of the electric signal. Ordinarily, means is provided for generating the pulse and means is provided for terminating the pulse upon completion of the predetermined time period.

Pulse width modulators are useful in process control for simple and accurate transfer of signals; the signal transfer being accomplished by pulses of predetermined pulse amplitude. Such devices are highly reliable and are capable of transferring signals with a high degree of accuracy over communication lines of only moderate quality. With a pulse width modulator, it is particularly important to obtain a high degree of linearity between the value of the modulation signal and the pulse width. Moreover, it is an advantage in certain applications to utilize pulse width modulation to derive two or more different signals in a predetermined manner.

It is an object of the present invention to provide a relatively simple pulse width modulator exhibiting a high degree of linearity.

It is another object of the present invention to provide a pulse width modulator whose pulse width output is dependent on one or two input signal values thereby providing an output pulse whose width is either a mathematical function of both input signals or, if one of the signals is a constant signal, is a mathematical function of the one input signal value.

According to the present invention a pulse width modulator is provided with an integration device for transforming the value of an electric signal to a pulse width of predetermined time period. Means is provided for generating a pulse and means is provided for terminating that pulse upon completion of the said predetermined time period. The integration device comprises a differential amplifier having an inverting and a non-inverting input and an output. A storage device is connected between the output and the inverting input with the inverting input being connected to a first input signal terminal. A second differential amplifier with an inverting and non-inverting input and an output is provided having its inverting input connected to the output of the first differential amplifier, and its non-inverting input connected to a second signal input terminal. A reset device for resetting the first differential amplifier is controlled by the output of the second differential amplifier.

One feature of the present invention resides in the fact that the pulse width output of the pulse width modulator provides a function of the quotient of the two input signals. This feature provides not only the possibility of obtaining a pulse width that is proportional or inversely proportional to a predetermined input signal at one input terminal (by providing a constant signal at the other input terminal), but also provides the possibility of obtaining a pulse width which is a function of the quotient of two input signals.

According to a modification of the present invention, the reset device comprises a time period determining device which is connected to the inverting input of the second differential amplifier. According to another modification of the present invention, a second pulse width modulator is operated in parallel with the first pulse width modulator so that one pulse width modulator forms part of the reset circuit for the other modulator, and conversely.

Yet another modification of the present invention resides in the provision of an additional inverting amplifier having its output connected to the inverting input of the first inverting amplifier. One of the signal inputs provides an input signal to the non-inverting input of the second inverting amplifier and to the inverting input of the third inverting amplifier.

The above and other features of this invention will be more fully understood from the following detailed description and the accompanying drawings, in which.

Figure 1:
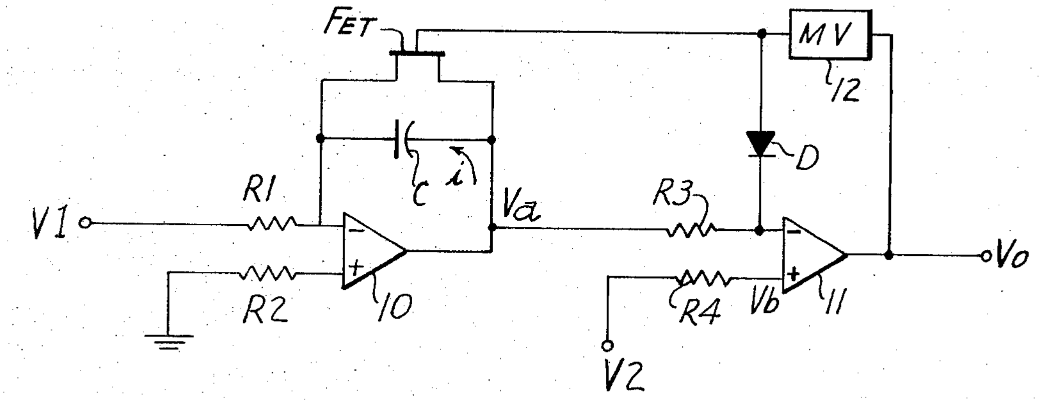
FIG. 1 is a schematic diagram illustrating the basic principles upon which the present invention is based.

With reference to the drawings, and particulary FIG. 1, there is illustrated a first differential amplifier 10 and a second differential amplifier 11. Differential amplifiers 10 and 11 each having inverting and non-inverting inputs designated by − and +, respectively. For an "inverting" input, a positive signal input will produce a negative signal output, whereas for a "non-inverting" input, a positive signal input will provide a positive signal output. A terminal adapted to receive an input signal V1 is connected via resistor R1 to the inverting input of differential amplifier 10. The non-inverting input of differential amplifier 10 is connected to ground via resistor R2. The output of differential amplifier 10 is connected via resistor R3 to the inverting input of differential amplifier 11 whose non-inverting input is connected via resistor R4 to a terminal adapted to receive a second input signal V2. The output of differential amplifier 11 is connected to an output terminal to supply an output voltage $Vo$. The output terminal of differential 11 is also connected to an input of monostable multivibrator 12 whose output is connected to the control electrode of field-effect transistor FET. The operating electrodes of the field-effect transistor are connected in parallel with capacitor C to the inverting input and output of differential amplifier 10.

As will be more fully understood hereinafter, monostable multivibrator MV and field-effect transistor FET serve to reset the pulse width modulator, which operation may be accomplished by apparatus other than that shown in FIG. 1.

In the operation of the apparatus illustrated in FIG. 1, when a negative voltage is supplied to the input terminal V1, amplifier 10 generates a voltage $Va$ which gradually increases. Signal $Va$ is applied to capacitor C and is also supplied to the inverting input of amplifier 11 via resistor R3. The current $i$ charging capacitor $C$ may be represented as:

$$i = C\ (dVa/dt) = (V1/R1)$$

from which follows:

$$Va = -(1/R1C) \int V1\ dt$$

Assuming $Va$ is initially relatively small as compared to input signal V2, and V2 equals $Vb$, amplifier 11 is operated in the first mode and will not switch over to operate in an opposite mode until signal Va equals input signal V2. Assuming input signal V1 is constant for the period of integration and amplifier 11 reverses when $Va = V2$, it is evident that:

$$V2 = -(1/R1C)\,V1T$$

from which follows:

$$T = -R1C\,(V2/V1)$$

Therefore, it is evident that a block pulse originates at the output of differential amplifier 11, the pulse width of which is proportional to the quotient ($V2/V1$). Therefore, it is possible to obtain a pulse width that is proportional to voltage $V2$ when $V1$ is made constant; or is proportional to the inverse of a voltage ($1/V1$) when $V2$ is chosen as a constant; or is proportional to the quotient of the voltages. It will be appreciated that the foregoing equations are not approximate equations so that the proportionality of the signals is obtained at an extremely high degree of accuracy.

When the output $Vo$ reverses, a pulse is transferred to multivibrator MV, the output of which is then subjected to a change in voltage which is forwarded via diode D to stabilize the reversed condition of differential amplifier 11. At the same time, multivibrator MV supplies a signal to field-effect transistor FET to operate the transistor to permit capacitor C to discharge through the transistor. When the monostable multivibrator again reverses, the foregoing described integration process may be repeated.

Figure 2:
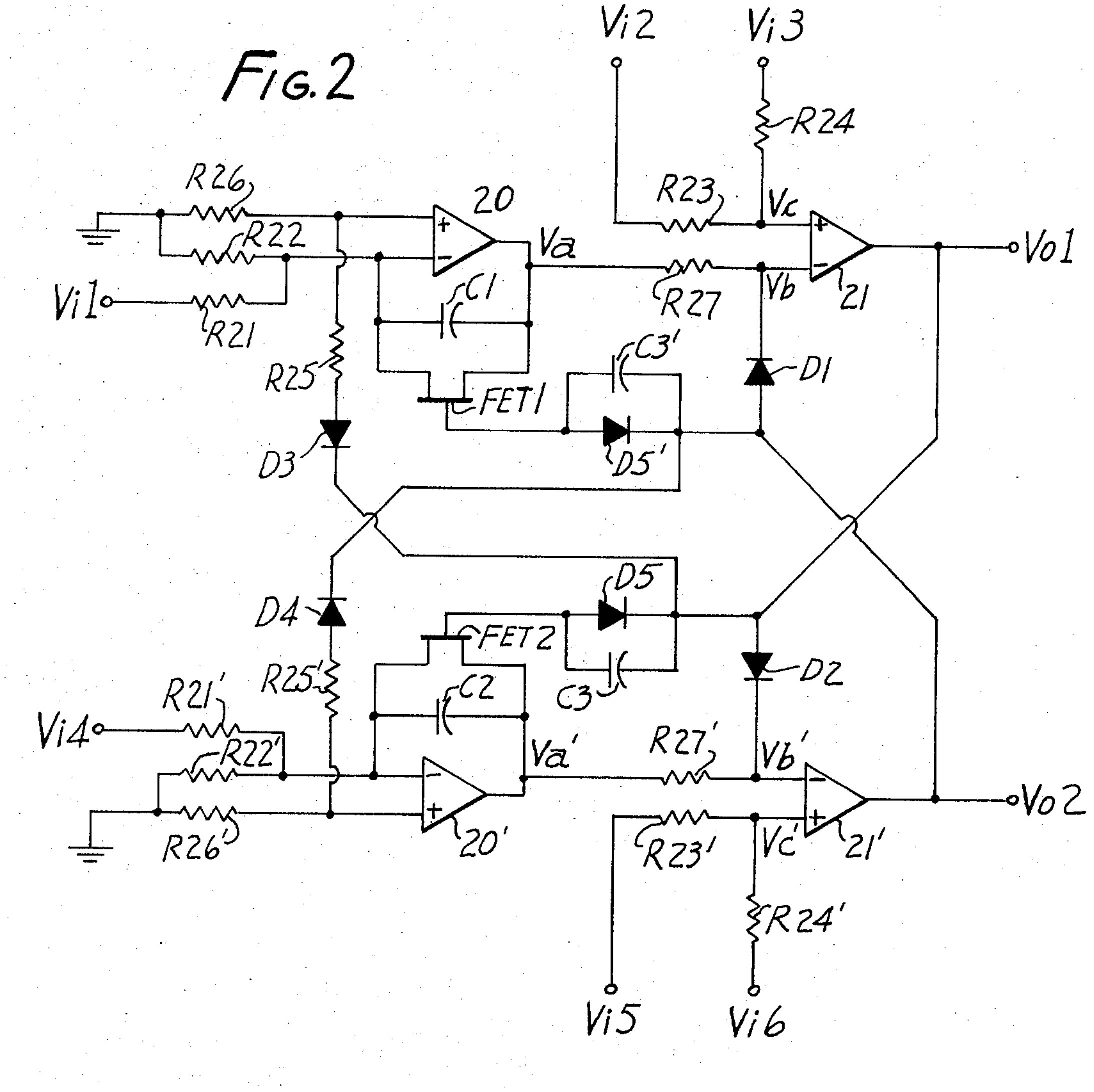
FIG. 2 is a schematic circuit diagram of a pulse width modulator in accordance with the presently preferred embodiment of the present invention.

FIG. 2 illustrates a modification of the present invention in which the integration and comparing branch consisting of differential amplifiers 10 and 11 is operated in parallel with a second, similar branch. Thus, in FIG. 2 there is illustrated differential amplifiers 20 and 21. The non-inverting input of amplifier 20 is connected via resistor R26 to ground, and the inverting input of amplifier 20 is connected via resistor R21 to input voltage V$i$1. Preferably, resistor R22 is connected between ground and the inverting input for purposes to be explained hereinafter. The output of amplifier 20 is connected through resistor R27 to the inverting input of differential amplifier 21. The non-inverting input of amplifier 21 is connected via resistor R23 to receive an input signal V$i$2 and through resistor R24 to receive an input signal V$i$3. The output of differential amplifier 21 is connected to an output terminal to supply output pulses V$o$1.

The lower half of FIG. 2 illustrates a pulse width modulator identical to that illustrated in the top half of FIG. 2; the reference numerals being primed to indicate elements similar to that shown in the top half of FIG. 2. Thus, the output of differential amplifier 21' is connected to an output terminal V$o$2 to supply output pulses. Also, the output of amplifier 21' is connected through diode D1 to the inverting input of amplifier 21 for stabilization purposes, and is connected to the control electrode of field-effect transistor FET1 (through diode D5') to operate that transistor to permit discharging of capacitor C1 (connected in parallel with field-effect transistor FET1 between the inverting input and the output of amplifier 20).

As shown in FIG. 2, the non-inverting input of amplifier 21 is connected via resistors R23 and R24, respectively, to two different voltage sources V$i$2 and V$i$3, respectively. (A corresponding circuit with resistors R23' and R24' and voltage connectiongs V$i$5 and V$i$6 are connected to the non-inverting input of differential amplifier 21'.) Therefore, the voltage input Vc to the non-inverting input of differential amplifier 21 may be represented as follows:

$$Vc = (R24/R24 + R23)\,Vi2 + (R23/R24 + R23)\,Vi3$$

Since differential amplifier 21 has a very high input impedance, substantially no voltage difference will be created across resistor R27. Therefore:

$$Va = Vb = -(1/R21C1)\int Vi1\,dt = -(Vi1T1/R21C1)$$

As heretofore explained in connection to FIG. 1, the reversal of differential amplifier 21 will occur when V$b$ = V$c$. Therefore, it follows:

$$T1 = -R21C1\,(R24/R23 + R24)\,(Vi2/Vi1) - R21C1\,(R23/R23 + R24)\,(Vi3/Vi1)$$

In the same manner, it is evident that for the integration time of the pulse width modulator shown in the lower half of FIG. 2 comprising differential amplifiers 20' and 21' is:

$$T2 = -R21'C2\,(R24'/R23' + R24')\,(Vi5/Vi4) - R21'C2\,(R23'/R23' + R24')\,(Vi6/Vi4)$$

To assure proper resetting of the integrators, an adequate time period should be provided to assure that V$c$ is greater than 0 and V$c'$ is greater than 0. Furthermore, the input voltages V$i$1 and V$i$4 should be negative.

Figures 3, 4:
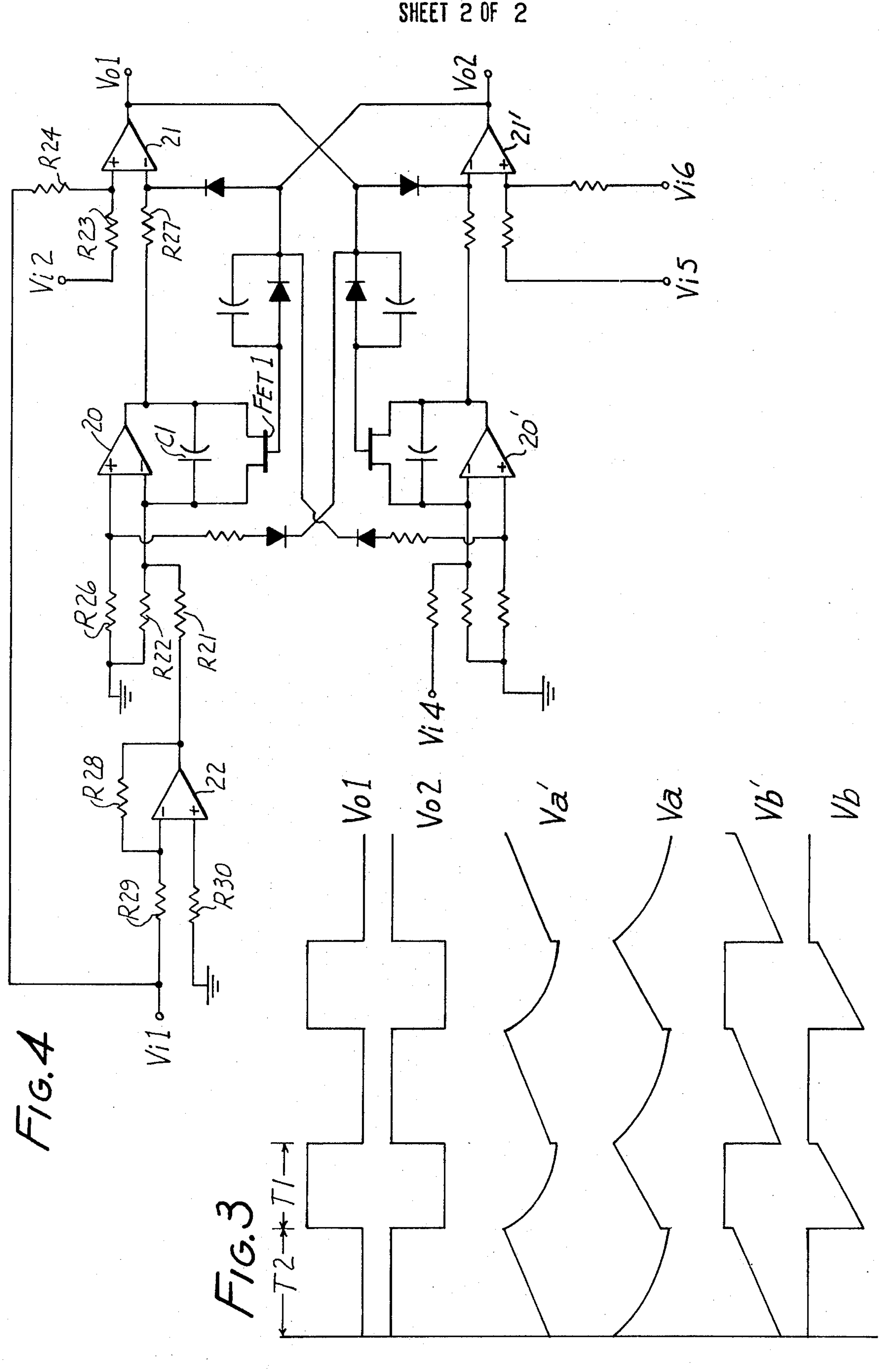
FIG. 3 is a time graph illustrating the principles of operation of the apparatus shown in FIG. 2.
FIG. 4 is a schematic circuit diagram of a modification of the invention illustrated in FIG. 2.

FIG. 3 illustrates the manner of operation of the apparatus in FIG. 2 commencing with the situation in which differential amplifier 20' commences to integrate. At this point, output voltage V$o$1 is low and output voltage V$o$2 is high. When voltage V$a'$ becomes equal to V$c'$, differential amplifier 21' reverses to produce a low voltage output V$o$2. The signal on the control electrode of FET1 being reduced renders differential amplifier 20 in an integrating state and simultaneously reverses differential amplifier 21 through diode D1 thereby switching the output voltage V$o$1 to high. Thus, the pulse width modulator with differential amplifiers 20 and 21 becomes operative. Upon completion of time period T1, voltage V$a$ and V$c$ become equal causing a reversal of differential amplifier 21 whereupon differential amplifier 21' is caused to reverse to lower the voltage V$o$1 and raise the voltage V$o$2 and simultaneously affectuate conduction of transistor FET1. The small vertical rises in the voltage charts of signals V$a$ and V$a'$ occur at the times of operation of differential amplifier 21 and 21' and originate from the branches containing diodes D3, D3' and resistors R25 and R25'. Similarly, the small vertical rises in the voltage graphs of signals V$b$ and V$b'$ originate from diodes D1 and D2.

From the foregoing, it is evident that a pulse width modulator is provided providing an output pulse width T1 whose duration is dependent upon three input voltages; namely, V$i$1, V$i$2 and V$i$3 and different pulses having time durations of T2 dependent upon three input voltages; namely, V$i$4, V$i$5 and V$i$6. It is evident, that by proper selection of the voltage inputs, pulse durations may be obtained which equal some constant plus a period of time proportional to an input voltage. For example, if V$i$1 equals −E and V$i$3 equals E, in which E is a constant feed voltage, then one obtains the following relation:

$$T1 = R21C1\,(R24/R23 + R24)\,(Vi2/E) + R21C1\,(R23/R23 + R24)$$

It should be noted that the last term of the foregoing equation is a constant and the intended proportionality is obtained in the first term of the equation.

As another example, assume it is desired to obtain a pulse width which is proportional to a constant and the inverse of one of the applied voltages. This can be obtained by setting V*i*1 equal to −V*i*3. An example of this arrangement is illustrated in FIG. 4 wherein differential amplifier 22 has an inverting input connected through resistor 29 to the input voltage V*i*1. The non-inverting input of amplifier 22 is connected to ground through resistor R30, and the output of amplifier 22 is connected through resistor R21 to the inverting input of amplifier 20. Further, input voltage signal V*i*1 is connected directly through resistor R24 to the non-inverting input of amplifier 21. The remainder of the circuit illustrated in FIG. 4 is identical to that shown in FIG. 2. Differential amplifier 22 provides a −V*i*1 signal input to the pulse width modulator consisting of amplifiers 20 and 21, whereas a +V*i*1 is connected directly to resistor R24 where signal terminal V*i*3 was located in FIG. 2.

The apparatus according to the present invention will operate in a stable manner, assuming a state exists in which one of the outputs is high and the other is low. However, upon initial operation of the apparatus, one cannot be assured that both outputs will not simultaneously go high or low. Accordingly, diode D3 and resistors R22, R25 and R26 are provided in connection with differential amplifier 20 and diode D4 and resistors R22′, R25′ and R26′ are provided in connection with amplifier 20′. The operation of these elements is such that when V*o*1 is low and differential amplifier 20 has continued to integrate until it is outside its normal operating range and possibly even saturated, current starts to flow through resistors R22, R25 and R26 and diode D3 so that the integrator commences back-integrating until it is back to its normal operation range. Similarly, diode D4, and resistors R25′, R26′ and R22′ operate in a similar manner in connection with differential amplifier 20′. It is preferable, for a reliable operation of the apparatus, that the following relations exist for these resistors:

$$(R26/R25 + R26) > (R22/R21 + R22)$$

and $$(R26'/R25' + R26') > (R22'/R21' + R22')$$

The present invention thus provides a reliable pulse width modulator which provides pulse width inversely proportional to a predetermined quantity. When both the pulse width and the width of interval between two pulses are proportional to that quantity the device is suitable for a very accurate frequency modulator.

The device is particularly useful in connection with data correction for telemetry purposes and for compensation of signals obtained from sensors.

This invention is not to be limited by the embodiments shown in the drawings and described in the description, which are given by way of example and not of limitation, but only in accordance with the scope of the appended claims.

What is claimed is:

1. A pulse width modulator, comprising:

integrator means comprising first inverting amplifier means having a first input, a second input and a first output, one of said first and second inputs being an inverting input and the other of said first and second inputs being a non-inverting input, and storage means connected between the first input and the first output of said first amplifier means;

second inverting amplifier having a third input, a fourth input and a second output, said third input being the same type as said first input and said fourth input being of the same type as said second input;

means connecting said first output to said third input, and means providing a reference potential to said second input;

first input means for supplying a signal to said first input and second input means for supplying a signal to said fourth input; and reset means connected to said second output for resetting said storage means.

2. Apparatus according to claim 1 wherein said storage means comprises a capacitor, and said reset means includes switch means connected in parallel with said capacitor and operable by the output from said second amplifier means to discharge said capacitor.

3. Apparatus according to claim 2 wherein said integrator means further includes a resistor connected in series between the first input of said first amplifier means and said first input means.

4. A pulse width modulator comprising:

first integrator means comprising first inverting amplifier means having a first input, a second input and a first output, one of said first and second inputs being an inverting input and the other of said first and second inputs being a non-inverting input, and first storage means connected between the first input and the first output of said first amplifier means;

second inverting amplifier means having a third input, a fourth input and a second output, said third input being of the same type as said first input and said fourth input being of the same type as said second input;

means connecting said first output to said third input, and means providing a reference potential to said second input;

second integrator means comprising third inverting amplifier means having a fifth input, a sixth input and a third output, said fifth input being of the same type as said first input and said sixth input being of the same type as said second input, and second storage means connected between the fifth input and the third output of said third amplifier means;

fourth inverting amplifier means having a seventh input, an eighth input and a fourth output, said seventh input being of the same type as said first input and said eighth input being of the same type as said second input;

means connecting said third output to said seventh input, and means providing a reference potential to said sixth input;

first input means for supplying a signal to said first input, second input means for supplying a signal to said fourth input, third input means for supplying a signal to said fifth input, and fourth input means for supplying a signal to said eight input;

first reset means connected to said fourth output for resetting said first storage means; and second reset means connected to said second output for resetting said second storage means.

5. Apparatus according to claim 4 wherein said first storage means comprises a first capacitor and said second storage means comprises a second capacitor, and said first reset means includes first switch means connected in parallel with said first capacitor and said second reset means includes second switch means connected in parallel with said second capacitor, said switch means each being operable to discharge the respective capacitor.

6. Apparatus according to claim 5 wherein said first integrator means further includes a first resistor connected in series between the first input of said first amplifier means and said first input means and said second integrator means further includes a second resistor connected in series between the fifth input of said third amplifier means and said third input means.

7. Apparatus according to claim 5 wherein said first switch means comprises a transistor having a control electrode connected to said fourth output and said second switch means comprises a transistor having a control electrode connected to said second output.

8. Apparatus according to claim 7 wherein said second input of said first amplifier means and said sixth input of said third amplifier means are each connected through an impedance to a predetermined voltage level, and further impedance means and diode means are serially connected between said second input and said second output and between said sixth input and said fourth output.

9. Apparatus according to claim 5 further including fifth inverting amplifier means having an inverting input, a non-inverting input and an output, means connecting a signal source to the inverting input of said fifth amplifier means and to said fourth input of said second amplifier means, means connecting the output of said fifth amplifier means to the first input of said amplifier means, and means providing a reference potential to said non-inverting input.

10. The method of pulse width modulation to derive a pulse having a time duration proportional to the quotient of second and first signal values and having a time duration between pulses proportional to the quotient of sixth and fourth signal values, comprising: commencing generation of a pulse while simultaneously commencing integration of the first signal to derive a third signal whose value changes in accordance with the integration with respect to time of the first signal, discontinuing said pulse while simultaneously halting said integration when the value of said third signal equals the value of said second signal, commencing integration of said fourth signal upon discontinuance of said pulse to derive a fifth signal whose value changes in accordance with the integration with respect to time of the value of said fourth signal while simultaneously inhibiting integration of said first signal, and commencing integration of said first signal while simultaneously halting integration of said fourth signal when the value of said fifth signal equals the value of said sixth signal.

* * * * *

UNITED STATES PATENT OFFICE
CERTIFICATE OF CORRECTION

Patent No. 3,866,146 Dated March 8, 1975

Inventor(s) Cornelis van Mourik

It is certified that error appears in the above-identified patent and that said Letters Patent are hereby corrected as shown below:

Column 1, line 6 for "timer" read --time--

Column 2, line 24, for "particulary" read --particularly--

Column 4, line 1, for "connectiongs" read --connections--

Column 4, line 6, read $$--Vc = \frac{R24}{R24+R23}Vi2 + \frac{R23}{R24 + R23}Vi3 --$$

Column 4, lines 16 and 17, read $$--T1 = -R21C1 \frac{R24}{R24 + R23} \frac{Vi2}{Vi1} -R21C1 \frac{R23}{R24+ R23} \frac{Vi3}{Vi1} --$$

Column 4, lines 24 and 25, read $$--T2 = -R21'C2 \frac{R24'}{R23' + R24'} \frac{Vi5}{Vi4} - R21'C2 \frac{R23'}{R23'+ R24'} \frac{Vi6}{Vi4} --$$

Column 5, lines 1 and 2, read $$--T1 = R21C1 \frac{R24}{R23 + R24} \frac{Vi2}{E} + R21C1 \frac{R23}{R23 + R24} --$$

Column 5, line 47, read $$-- \frac{R26}{R25 + R26} > \frac{R22}{R21 + R22} --$$

Column 5, line 51, read $$-- \frac{R26'}{R25' + R26'} > \frac{R22'}{R21' + R22'} --$$

Column 8, line 9, in the eighth line of claim 9, before "amplifier" read --first--

Signed and sealed this 27th day of May 1975.

(SEAL)
Attest:

RUTH C. MASON
Attesting Officer

C. MARSHALL DANN
Commissioner of Patents
and Trademarks